United States Patent [19]

Wada et al.

[11] Patent Number: 5,066,765

[45] Date of Patent: Nov. 19, 1991

[54] POLY(AZOMETHINE-ESTER) HAVING FILM-FORMING ABILITY, AND HEAT RESISTANCE PRE AND REGULATED MONOMER SEQUENCES IN THE POLYMER BACKBONE

[75] Inventors: Keiichiro Wada, San Marcos; Patrick E. Cassidy; William S. Hager, both of Austin, all of Tex.

[73] Assignee: Nippon Steel Chemical Co., Ltd., Tokyo, Japan

[21] Appl. No.: 507,536

[22] Filed: Apr. 11, 1990

[51] Int. Cl.$^5$ .............................................. C08G 63/00
[52] U.S. Cl. .................................... 528/185; 528/176; 528/183
[58] Field of Search ......................... 528/176, 183, 185

[56] References Cited

U.S. PATENT DOCUMENTS

| | | | |
|---|---|---|---|
| 3,094,511 | 6/1963 | Hill, Jr. et al. | 528/183 |
| 3,475,385 | 10/1969 | Goodman et al. | 528/183 |
| 4,048,148 | 9/1977 | Morgan | 528/229 |
| 4,122,070 | 10/1978 | Morgan | 528/149 |
| 4,727,131 | 2/1988 | Kock et al. | 528/183 |

OTHER PUBLICATIONS

"Aromatic Azomethine Polymers and Fibers", P. W. Morgan, S. L. Kwolek, T. C. Pletcher, Macromolecules, 20, pp. 729-739 (1987).

"Aromatic-Aliphatic Azomethine Ether Polymers and Fibers", P. W. Wojikowski, Macrmolecules, 20, pp. 740-748.

"Preparation and Properties of Fluorine-Containing Condensation Polymers III: Polyazomethines", Y. Saegusa, M. Kuriki, and S. Nakamura, Polymer Preprints, Japan 37(2), p. 299 (1988).

Japan Kokai Tokyo Koho JP 63, 264-635, "Azomethine Group-Containing Siloxanes with Good Transparency, Heat Resistance and Adhesion", Chemical Abstracts, 111: 79208r (1989).

"Synthesis and Characterization of Random and Segmented Soluble Poly (Azomethine Sulfones", C. D. Smith, pp. 316-321 (1989).

"Copolyarylates with Azomethine Groups in the Main Chain", K. Z. Mokaeva, pp. 106-108.

Polyazo Compounds, vol. 10, pp. 659-675.

*Primary Examiner*—Harold D. Anderson
*Assistant Examiner*—T. Mosley
*Attorney, Agent, or Firm*—Armstrong, Nikaido, Marmelstein, Kubovcik & Murray

[57] ABSTRACT

This invention relates to a poly(azomethine-ester) having a repeating structural unit of the following formula [1]

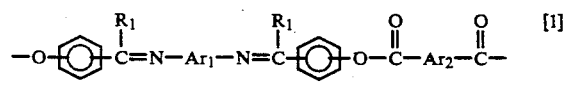

wherein $Ar_1$ and $Ar_2$, which may be the same or different, are selected from phenylene or divalent organic radicals terminated with an aromatic ring on the both ends of the each radical, respectively, and $R_1$ is selected from hydrogen, alkyl, alkoxy or aryl radical. The poly(azomethine-esters) according to the present invention are soluble in common organic solvents and have film-forming ability and heat-resistance.

5 Claims, 2 Drawing Sheets

POLY(AZOMETHINE-ESTER) HAVING FILM-FORMING ABILITY, AND HEAT RESISTANCE PRE AND REGULATED MONOMER SEQUENCES IN THE POLYMER BACKBONE

FIELD OF THE INVENTION AND RELATED ART STATEMENT

The present invention relates to polymers containing both ester and azomethine units in the backbone, namely, poly(azomethine-esters) having practical usability such as solubility, film-forming ability, and heat resistance.

The polymers containing both ester and azomethine units according to the present invention are utilized in various fields, specially as layer insulating materials for LSI, solder-resists, liquid crystal oriented films, various protective films and coatings, enamel varnishes, flexible printed circuit substrates, memory devices, memory substrates, (photo) conductive material, etc. in the electric, electronic, photonic, and photonics material fields; as color filters, optical pick-up structures, etc., in the optical field; and as gas separation and purification apparatuses such as medical and industrial oxygen enrichment apparatuses, filter apparatuses such as food or medical water purifiers, gas-liquid separation apparatuses in the separation membrane field; and heat-resistant fibers and fiber-coatings in the industrial material field.

In the prior articles, wholly aromatic polyazomethines have been reported as heat-resistant materials with liquid crystallinity, and those were applicable to high elastic modulus fibers in, for example, Macromolecules, 20, pp 729–739 (1987) and U.S. Pat. Nos. 4,048,148 and 4,122,070. However, wholly aromatic polyazomethines, obtained from a well-known method of polycondensation of aromatic dialdehydes or their derivatives with diamines, were insoluble in common organic solvents, thus forming poor films or coatings. Introduction of aliphatic chains and/or substituents on the aromatic rings in the polymer backbones decreases the melting point of polymers and sacrifices their thermal stability and molecular regularity.

Recently, McGrath et al. reported random and segmented soluble poly (azomethine sulfones) in Proceedings of the American Chemical Society, Division of Polymeric Materials; Science and Engineering, 60, pp 316–321 (1989). However, these related copolyazomethines used considerable amounts of comonomer units such as polysulfone oligomer to obtain polymers soluble in common organic solvents, but made it difficult to attain alternately regulated monomer sequences and high concentration of azomethine units in the polymer backbones.

Mokaeva et al. reported film-formable copolyarylates with azomethine groups in the main chain in Izvestiya Severo-Kaykazkogo Nauchnogo Tsentra Vysshel Shkoly Seriya Estestvennykh Nauki, 1988(4), pp 106–8.

Their approach, however, is very limited in that only one type of copolyarylate was synthesized by copolymerization of a phthaloyl chloride with 2,2-bis(4-hydroxyphenyl) propane and an azomethine-containing bisphenol (structure [E]) derived from terephthalaldehyde, to obtain only a low molecular weight substance.

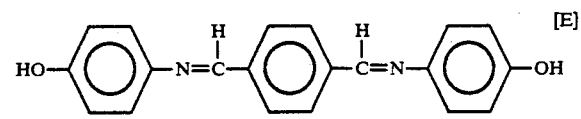

Furthermore, it is difficult to get regulated monomer sequences as well as high concentration of azomethine units in the polymer because the polymer is soluble and film-formable only when the backbone contains fewer than half azomethine-containing repeating units.

OBJECT AND SUMMARY OF THE INVENTION

The objective of the present invention is to provide novel azomethine polymers which are soluble in common organic solvents and which have film-forming ability and heat-resistance, and preferably with regulated monomer sequences in the polymer backbones.

In accordance with the present invention, there is provided a soluble poly(azomethine-ester) having a polyazomethine repeating unit and a polyester repeating unit, having a repeating structural unit of the following formula [1]

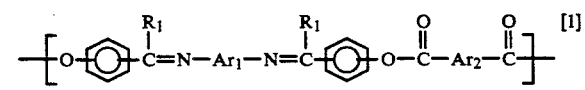

wherein $Ar_1$ and $Ar_2$, which may be the same or different, are selected from phenylene or divalent organic radicals terminated with an aromatic ring on the both ends of the each radical, respectively, and $R_1$ is selected from hydrogen, alkyl, alkoxy or aryl. The above-mentioned poly(azomethine-ester) could be obtained from the reaction of an azomethine-containing bisphenol of the following general formula [2]

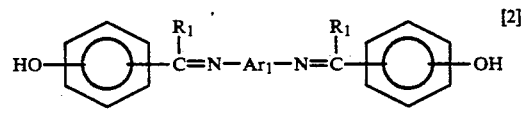

wherein $Ar_1$ is selected from phenylene or divalent organic radical terminated with an aromatic ring on the both ends of the radical, and $R_1$ is selected from hydrogen, alkyl, alkoxy or aryl radical with an aromatic dicarboxylic acid or their derivative of the general formula [4]

$$XOC—Ar_2—COX \qquad [4]$$

wherein $Ar_2$ is selected from phenylene or divalent organic radical terminated with an aromatic ring on the both ends of the radical, and X is selected from halogen, hydroxy or alkoxy radical. In the above-mentioned poly(azomethine-ester), at least one of $Ar_1$ and $Ar_2$ preferably contains a hexafluoroisopropylidene unit of the following formula [3].

$$—C(CF_3)_2— \qquad [3]$$

In the above-mentioned poly(azomethine-ester) having the general formula [1] according to the present invention, $Ar_1$ and $Ar_2$ are phenylenes or divalent organic radicals terminated with an aromatic ring on the both ends of the radicals, from the class comprising of

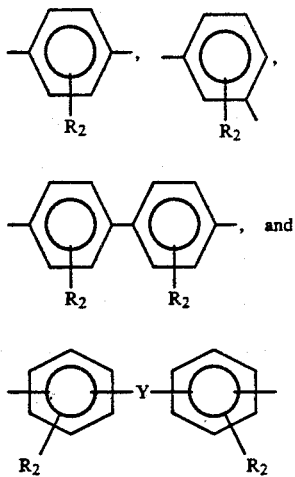

wherein Y is a divalent organic radical from the class comprising of

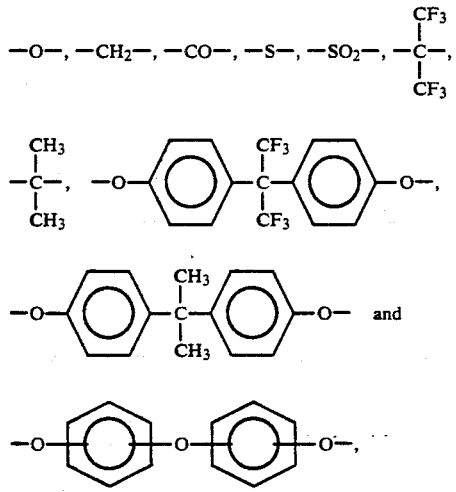

and $R_2$ is hydrogen, if any, a monovalent replacement for hydrogen on nuclear carbon from the class comprising of chloro, lower alkyl and lower alkoxy, preferably is chloro, lower alkyl radical having a corbon number of less than 3 or lower alkoxy having a corbon number of less than 3. A replacement number of $R_2$ is 0 to 4, preferably 0 or 1 per one aromatic ring when $R_2$ is the monovalent replacement, and $R_2$s may be the same or different when the replacement number of $R_2$ is 2 or more.

In the poly(azomethine-esters) according to present invention, the word "azomethine" means the divalent radical "—C=N($R_1$)—", and $R_1$ is not always hydrogen but has the previously given significance.

The poly(azomethine-esters) according to the present invention can be obtained by the reaction of at least one each of diamines, hydroxyarylaldehydes or their derivatives, and aromatic dicarboxylic acid derivatives at a predetermined ratio.

The aromatic diamines usable in the present invention are given as the following general formula [5]

$$H_2H-Ar_1-NH_2 \qquad [5]$$

wherein $Ar_1$ is same as the previously given significance and, to put them concretely, include 1,2- 1,3- and 1,4-diaminobenzene, 3,3'-3,4'- and 4,4'-diaminodiphenylether, 4,4'-diaminodiphenylsulfide, 3,3'- and 4,4'-diaminodiphenylsulfone, 1,5- and 1,8-diaminonaphthalene, 4,4'-diaminodiphenylmethane, 4,4'-diaminooctafluorobiphenyl, m-xylylenediamine, 2,2-bis(4-aminophenyl)hexafluoropropane, 2,2-bis[4-(4-aminophenoxy)phenyl]propane, 2,2-bis[4-(4-aminophenoxy)hexafluorophenyl]propane, 2,2-bis[4-(4-aminohenoxy)phenyl]sulfone, 4-amino-4'-aminobenzanilide, 4-amino-4'-amino-2'-methoxylbenzanilide, and their derivatives.

The hydroxyarylaldehydes or their derivatives usable in the present invention are given as the following general formula [6]

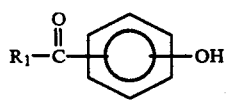 [6]

wherein $R_1$ is same as the previously given significance. Namely, $R_1$ is selected from hydrogen, alkyl, alkoxy or aryl, and these compounds are hydroxyphenylaldehydes when $R_1$ is hydrogen, and these compounds are phenones when $R_1$ is alkyl or aryl, and further these compounds are esters when $R_1$ is alkoxy. These compounds, hydroxyphenylaldehydes, ketones and esters are used as the hydroxyarylaldehydes or their derivatives. The hydroxyarylaldehydes include, for example, 3-hydroxybenzaldehyde and 4-hydroxybenzaldehyde. And their derivatives include hydroxybenzophenones, such as 4-hydroxybenzophenone, hydroxyacetophenones, such as 4'-hydroxyacetophenone, or hydroxybenzoate, such as methyl 4-hydroxybenzoate.

The aromatic dicarboxylic acids and their derivatives usable in the present invention are given as the following general formula [4]

$$XOC-Ar_2-COX \qquad [4]$$

wherein $Ar_2$ and X are same as the previously given significances, and include, for example, o-phthalic acid, isophthalic acid, terephthalic acid, 4,4'-benzophenonedicarboylic acid, 4,4'-thiodibenzoic acid, 4,4'-sulfonyldibenzoic acid, 4,4'-diphenylmethanedicarboxylic acid, 1,2-diphenylethane-4,4'-dicarboxylic acid, 1,1-diphenylethane-4,4'-dicarboxylic acid, 2,2-diphenylpropane-4,4'-dicarboxylic acid, 2,2-bis(4-carboxyphenyl)propane, 2,2-bis(4-carboxyphenyl)hexafluoropropane, and their derivatives, such as acid halides and esters.

Of the above-mentioned compounds, the compounds of preference used in the present invention include 4,4'-diaminodiphenylether, 2,2-bis(4-aminophenyl)hexafluoropropane, 2,2-bis[4-(4-aminophenoxy)phenyl]hexaflurorpropane, 2,2-bis[4-(4-aminophenoxy) phenyl]propane, and 2,2-bis[4-(4-aminophenoxy)phenyl]sulfone as the diamine, 3-hydroxybenzaldehyde and 4-hydroxybenzaldehyde as the hydroxyarylaldehyde, and 2,2-bis(4-chloroformylphenyl)hexafluoropropane, 2,2-bis(4-chloroformylphenyl)propane, isophthaloyldichloride and terephthaloyl chloride as the aromatic dicarboxylic acid derivative.

Poly(azomethine-ester) can be synthesized, for example, in the following way. An azomethine-containing bisphenol having the general formula [2] is obtained by the reaction of an aromatic diamine having the general formula [5] with a hydroxyarylaldehyde having the general formula [6] in a solvent. The bisphenol is polymerized with an aromatic diacid chloride having the general formula [4] by using phase transfer polymerization conditions to get a poly(azomethine-ester) having the general formula [1].

The solvents usable for synthesizing the bisphenol are, for example, chlorobenzene, N,N-dimethylformamide, tetrahydrofuran, toluene and their mixtures. The temperature range and the reaction period applicable for the synthesis are 30°–200° C., preferably 100°–180° C., and 1–24 hours, preferably 3–6 hours. No critical molar ratios of the diamine to the hydroxyarylaldehyde are necessary in the reaction; however, the preferable molar ratio is 1/0.5 to 1/0.4. To avoid contamination, the reaction may be carried out under inert atmosphere, such as argon and nitrogen.

The conditions usable for the polymerization are quite variable and any conventional methods for polycondensation are applicable. The molar ratio of an azomethine-containing bisphenol to an aromatic diacid derivative is preferably 1/0.9 to 1/1.1.

The synthesis method is not limited to the above-mentioned method, and the reaction conditions and other factors may be suitably modified.

The above-mentioned poly(azomethine-ester) can be synthesized by copolymerization with comonomers without azomethine units. However, the amount of the comonomer units in the basic repeating unit can be less than 50%, preferably, less than 20%, to maintain high concentrations of azomethine units in the polymer.

The above-mentioned poly(azomethine-ester) is easy to process as it is soluble in common organic solvents. It shows good film-forming properties when the inherent viscosity ($\eta_{inh}$), determined at a solution of 0.25 g of the polymer in 100 ml of chloroform or N-methylprrolidone with the aid of an Ostwald viscometer, is 0.2 dL/g or more at 25° C. However, the organic solvent used depends on the composition of the polymer in question.

Furthermore, the poly(azomethine-ester) is characterized by excellent heat resistance and shows a temperature for the 10% weight loss of 400° C. or more even in the air as determined by a thermogravimetric analyzer (TGA).

DETAILED DESCRIPTION OF THE PREFERRED EMBODIMENT

The present invention will be described in further detail with reference to the following Examples, which do not, however, limit the invention in any way.

EXAMPLE 1

Synthesis of Bisphenol (Compound A) Containing Azomethine Units

Compound A

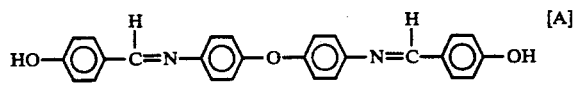

Figure 1:
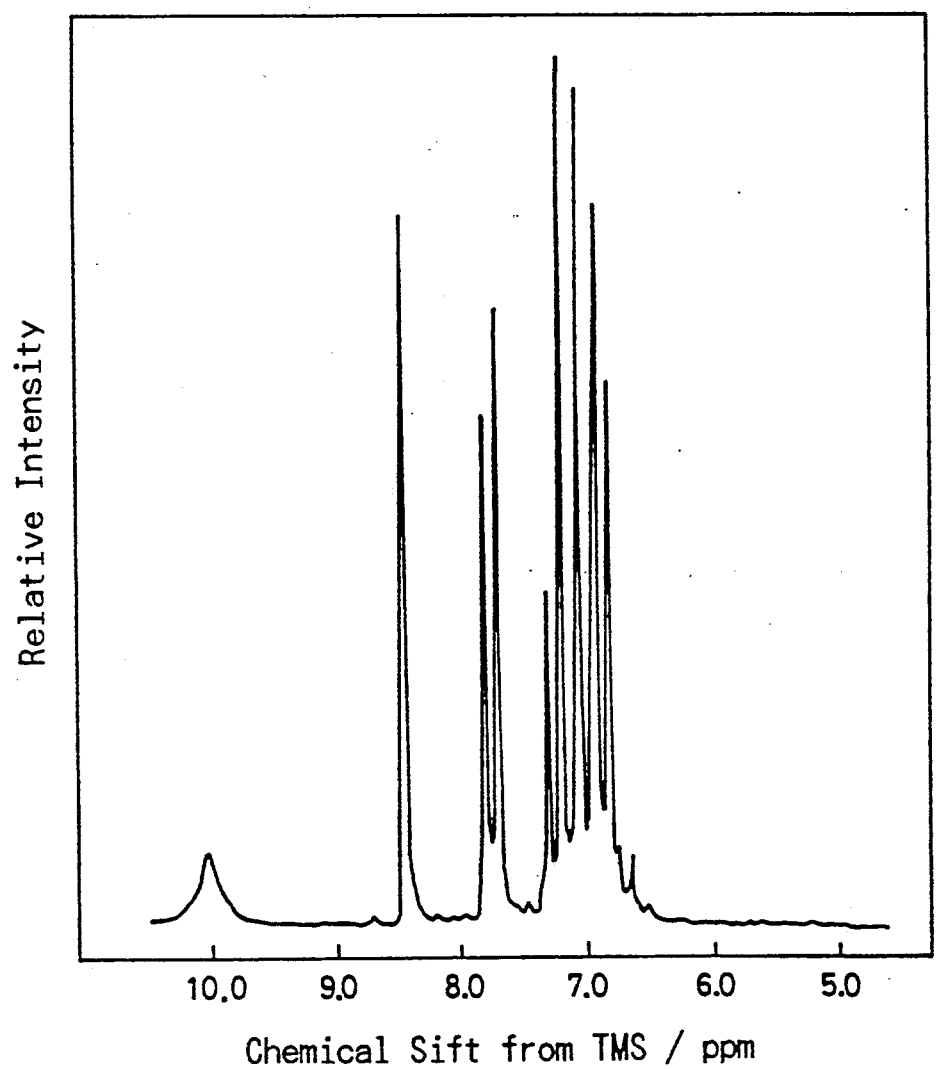
FIG. 1 is a $^1$H—NMR spectrum of an azomethine-containing bisphenol (Compound A) synthesized by reacting 4,4'-diaminodiphenylether with 4-hydroxybenzaldehyde.

2.002 g (0.010 mol) of 4,4'-diaminodiphenylether and 20 ml of chlorobenzene (Cl—Bz) were placed in a 100 ml, three-neck, round-bottom flask equipped with an argon inlet, a condenser, and a thermometer under a flow of argon. The mixture was magnetically stirred and heated until homogeneous. To the solution was added 20 ml of a Cl—Bz dispersion of 2.565 g (0.021 mol) of 4-hydroxybenzaldehyde and the temperature was elevated to reflux. After 4 hrs, a yellow precipitate was collected by vacuum filtration while hot and washed with a sufficient amount of Cl—Bz until the filtrate was colorless. The obtained compound was dried in vacuo at 80° C. for 12 hrs, and then recrystallized from acetone/hexane. The product was dried in vacuo at 80° C. for 5 hrs to give 3.149 g (77.1%) of a yellow crystalline solid, m.p. 236°–8° C. The structure was confirmed by $^1$H—NMR spectrum, shown in FIG. 1 {δ=10.0(2H,—OH), 8.5(2H,—CH=N—), 7.8–6.5(16H, aromatic H)} and elemental analysis, shown below.

Elemental Analysis for $C_{26}H_{20}N_2O_3$: Calc'd: C(%): 76.46; H(%): 4.94; N(%): 6.86. Found: C(%): 76.65; H(%): 4.86; N(%): 6.76.

Synthesis of Poly(Azomethine-Ester)

Figure 2:
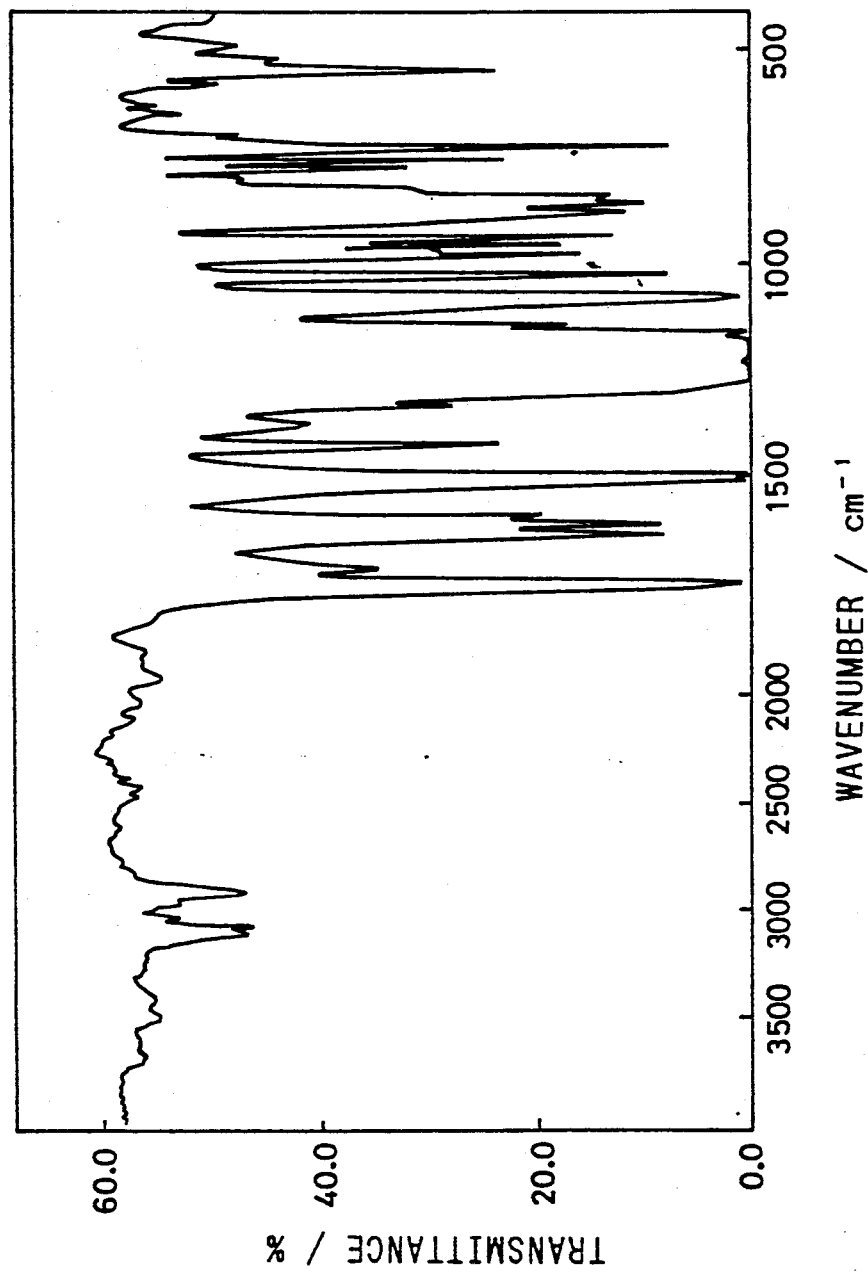
FIG. 2 is an IR absorption spectrum of a poly(azomethine-ester) synthesized from polycondensation of Compound A with 2,2-bis(4-chloroformylphenyl)hexafluoropropane.

0.4085 g (1.00 mmol) of Compound A and 30 ml of sodium hydroxide (NaOH) aqueous solution (2.1 mmol of NaOH) were added to a clean 100 ml flask. The mixture was magnetically stirred, and 0.070 g of tetrabutylammonium bromide was added. To this mixture was added all at once a solution of 2,2-bis(4-chloroformylphenyl)hexafluoropropane (6FDAC) (0.4291 g, 1.00 mmol) in 20 ml of methylene chloride and stirring was continued for 4 hrs at room temperature. From the resulting mixture, the organic phase was carefully separated and poured into 300 ml of methanol. The precipitate was collected by vacuum filtration and dried in vacuo at 80° C. for 4 hrs to give 0.650 g (85.0%) of the desired poly(azomethine-ester) (P-1) as a white powder with an inherent viscosity of 0.61 dL/g in chloroform (CHCl$_3$). The structure was confirmed by infrared absorption spectrum, shown in FIG. 2, and elemental analysis, shown below.

Elemental Analysis for $(C_{43}H_{26}N_2O_5F_6)_n$: Calc'd: C(%): 67.45; H(%): 3.43; N(%): 3.66. Found: C(%): 67.83; H(%): 3.36; N(%): 3.54.

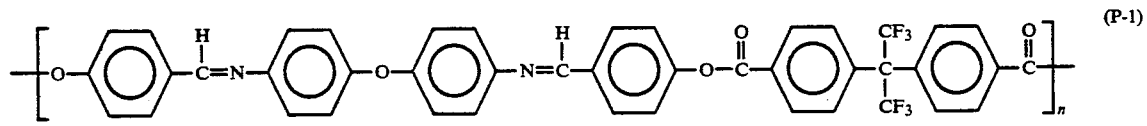

Tough, transparent, pale yellow film was cast from a CHCl$_3$ solution of the poly(azomethine-ester). Some properties of the polymer are listed in Table 1.

EXAMPLE 2

Synthesis of Bisphenol (Compound B) Containing Azomethine Units

Compound B

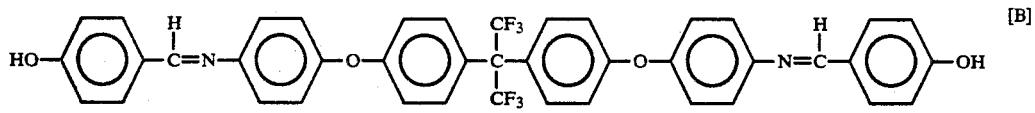

The same procedure was performed as described in Example 1, except for using 5.185 g (0.010 mol) of 2,2-bis[4-(4-aminophenoxy)phenyl]hexafluoropropane in place of 4,4'-diaminodiphenylether, to yield 5.780 g (79.5%) of Compound B as a light yellow power, m.p. 221°-3° C. The structure was confirmed by $^1$H—NMR spectrum and elemental analysis.

Synthesis of Poly(Azomethine-Ester)

The same procedure was performed as described in Example 1, except for using 0.7267 g of Compound B in place of Compound A to obtain 0.880 g (81.5%) of the desired poly(azomethine-ester) (P-2) as a white, fluffy powder with an inherent viscosity of 1.26 dL/g in CHCl$_3$. The structure was confimed by $^1$H—NMR, infrared absorption spectrum, and elemental analysis.

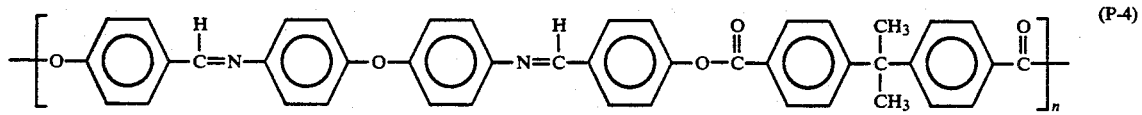

Tough, transparent, colorless film was cast from a CHCl$_3$ solution of the poly(azomethine-ester). Some properties of the polymer are listed in Table 1.

EXAMPLE 3

Synthesis of Poly(Azomethine-Ester)

The same procedure as mentioned in Example 1 was used, except for using 0.7267 g of Compound B in place of Compound A and 0.3212 g of 2,2-bis(4-chloroformylphenyl)propane (6HDAC) in place of 6FDAC, to obtain 0.893 g (91.6%) of the desired poly(azomethine-ester) (P-3) as a white powder with an inherent viscosity of 0.45 dL/g in CHCl$_3$.

Tough, transparent, pale yellow film was cast from a CHCl$_3$ solution of the poly(azomethine-ester). Some properties of the polymer are listed in Table 1.

EXAMPLE 4

Synthesis of Poly(Azomethine-Ester)

The same procedure as mentioned in Example 1 was used, except for using 0.3212 g of 2,2-bis(4-chloroformylphenyl)propane (6HDAC) in place of 6FDAC, to obtain 0.520 g (79.1%) of the desired poly(azomethine-ester) (P-4) as a white powder with an inherent viscosity of 1.36 dL/g in N-methylpyrrolidone (NMP).

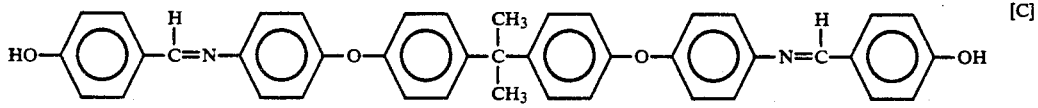

Tough, transparent, light yellow film was obtained from an NMP solution of the poly(azomethine-ester). Some properties of the polymer are listed in Table 1.

EXAMPLE 5

Synthesis of Bisphenol (Compound C) Containing Azomethine Units

Compound C

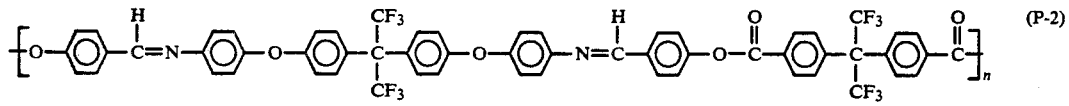

The same procedure was performed as described in Example 1, except for using 4.105 g (0.010 mol) of 2,2-bis[4-(4-aminophenoxy)phenyl]propane in place of 4,4'-diaminodiphenylether, to yield 4.14 g (66.9%) of Compound C as a yellow powder, m.p. 147°-9° C. The structure was confirmed by $^1$H—NMR spectrum and elemental analysis.

Synthesis of Poly(Azomethine-Ester)

The same procedure was performed as described in Example 1, except for using 0.6187 g of Compound C in place of Compound A to obtain 0.590 g (60.5%) of the desired poly(azomethine-ester) (P-5) as a white fluffy powder with an inherent viscosity of 0.30 dL/g in CHCl$_3$.

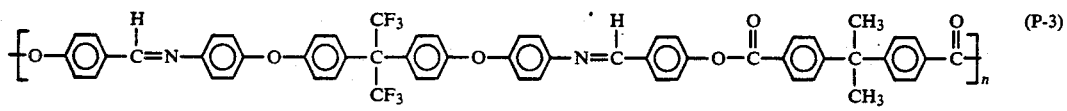

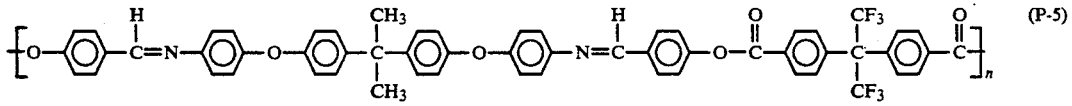

Tough, transparent, pale-yellow film was cast from a CHCl₃ solution of the poly(azomethine-ester). Some properties of the polymer are listed in Table 1.

EXAMPLE 6

Synthesis of Bisphenol (Compound D) Containing Azomethine Units

Compound D

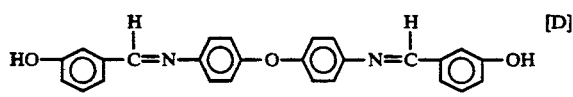

The same procedure was performed as described in Example 1, except for using 2.565 g (0.021 mol) of 3-hydroxybenzaldehide in place of 4-hydroxybenzaldehide, to yield 3.18 g (77.9%) of Compound D as a yellowish white powder, m.p. 199°–200° C. The structure was confirmed by ¹H—NMR spectrum and elemental analysis.

Synthesis of Poly(Azomethine-Ester)

The same procedure was performed as described in Example 1, except for using 0.4085 g of Compound D in place of Compound A to obtain 0.700 g (91.5%) of the desired poly(azomethine-ester) (P-6) as a white powder with an inherent viscosity of 0.23 dL/g in CHCl₃.

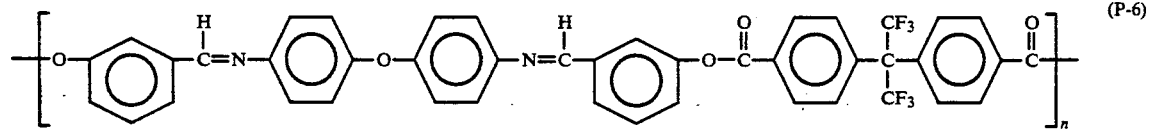

Tough, transparent, pale-yellow film was cast from a CHCl₃ solution of the poly(azomethine-ester). Some properties of the polymer are listed in Table 1.

TABLE 1

| Example No. | Inherent Viscosity$^a$ (dL/g) | IR absorption $v_{C=O}/cm^{-1}$ | $v_{CH=N}/cm^{-1}$ | Thermal Decomposition Temperature$^b$/°C. N₂ | Air |
|---|---|---|---|---|---|
| 1 | 0.61 | 1744 | 1628 | 455 | 407 |
| 2 | 1.26 | 1743 | 1629 | 459 | 424 |
| 3 | 0.45 | 1741 | 1627 | 474 | 442 |
| 4 | 1.36$^c$ | 1735 | 1629 | 454 | 403 |
| 5 | 0.30 | 1745 | 1627 | 461 | 447 |
| 6 | 0.23 | 1744 | 1628 | 487 | 499 |

$^a$Inherent viscosity measured at a concentration of 0.25 g/dL in chloroform at 25° C.
$^b$Temperature of 10% weight loss at heating rate of 20° C./min.
$^c$In N-methylpyrrolidone.

As explained above, the poly(azomethine-ester) of the present invention is a polymeric material of excellent heat resistance and processability useful for a wide range of industrial applications. Furthermore, it can be used as copolymer or polymer blend with the units containing no azomethine moieties, as a mixture with metals, metal ions, metal oxides, or metal salts, and as a composite with organic or inorganic compounds as well as by itself.

What is claimed is:

1. A poly(azomethine-ester) having a repeating structural unit of the following formula (1)

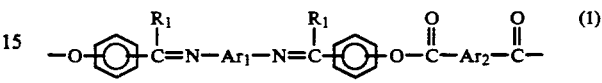

wherein Ar₁, and Ar₂ are the same or different and are at least one member selected from the group consisting of phenylene and divalent organic radicals terminated with an aromatic ring on the both ends of the each radical, respectively, and R₁ is at least one member selected from the group consisting of hydrogen, alkyl, alkoxy and aryl radical.

2. A poly(azomethine-ester) according to claim 1, which is obtained from the reaction of an azomethine-containing bisphenol of the following general formula (2) with an aromatic dicarboxylic acid derivative:

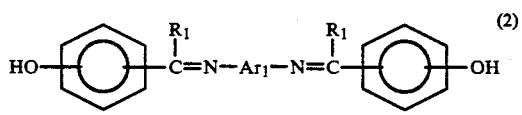

wherein Ar₁ is a member selected from the group consisting of phenylene and divalent organic radicals terminated with an aromatic ring on the both ends of the radical, and R₁ is at least one member selected from the group consisting of hydrogen, alkyl, alkoxy and aryl radical.

3. A poly(azomethine-ester) according to claim 1, wherein at least one of Ar₁ and Ar₂ contains a hexafluoroisopropylidene unit of the following formula (3)

$$—C(CF_3)_2— \quad (3)$$

4. A poly(azomethine-ester) according to claim 1, having an inherent viscosity ($\eta_{inh}$), based on a value obtained by dissolving 0.25 g of the polymer in 100 ml of chloroform or N-methylpyrrolidone and measuring the solution at 25° C., of 0.20 dL/g or more.

5. A method for preparing a poly(azomethine-ester) having a repeating structural unit of the following formula (1)

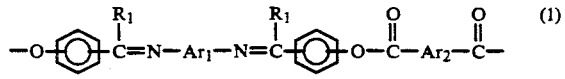

wherein $Ar_1$ and $Ar_2$ are the same or different and are at least one member selected from the group consisting of phenylene and divalent organic radicals terminated with an aromatic ring on the both ends of the each radical, respectively, and $R_1$ is at least one member selected from the group consisting of hydrogen, alkyl, alkoxy and aryl radical, by reacting an azomethine-containing bisphenol of the following general formula (2)

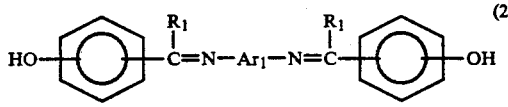

wherein $Ar_1$ is a member selected from the group consisting of phenylene and divalent organic radicals terminated with an aromatic ring on the both ends of the radical, and $R_1$ is at least one member selected from the group consisting of hydrogen, alkyl, alkoxy and aryl radical; with an aromatic dicarboxylic acid or its derivative of the general formula (4)

$$XOC-Ar_2-COX \qquad (4)$$

wherein $Ar_2$ is a member selected from the group consisting of phenylene and divalent organic radicals terminated with an aromatic ring on the both ends of the radical, and X is at least one member selected from the group consisting of halogen, hydroxy and alkoxy radical.

* * * * *

UNITED STATES PATENT AND TRADEMARK OFFICE
CERTIFICATE OF CORRECTION

PATENT NO. : 5,066,765
DATED : November 19, 1991
INVENTOR(S) : Keiichiro WADA et al It is certified that error appears in the above-identified patent and that said Letters Patent is hereby corrected as shown below:

On title page, item [54] and col. 1, lines 1-4, "POLY(AZOMETHINE-ESTER) HAVING FILM-FORMING ABILITY, AND HEAT RESISTANCE PRE AND REGULATED MONOMER SEQUENCES IN THE POLYMER BACKBONE" should read -- POLY(AZOMETHINE-ESTER) HAVING FILM-FORMING ABILITY, HEAT RESISTANCE AND REGULATED MONOMER SEQUENCES IN THE POLYMER BACKBONE --

Signed and Sealed this

Third Day of August, 1993

Attest:

MICHAEL K. KIRK

Attesting Officer

Acting Commissioner of Patents and Trademarks